July 13, 1954          C. N. GARDNER ET AL          2,683,326
RODENT EXTERMINATING DEVICE
Filed Oct. 8, 1952                                 2 Sheets-Sheet 1
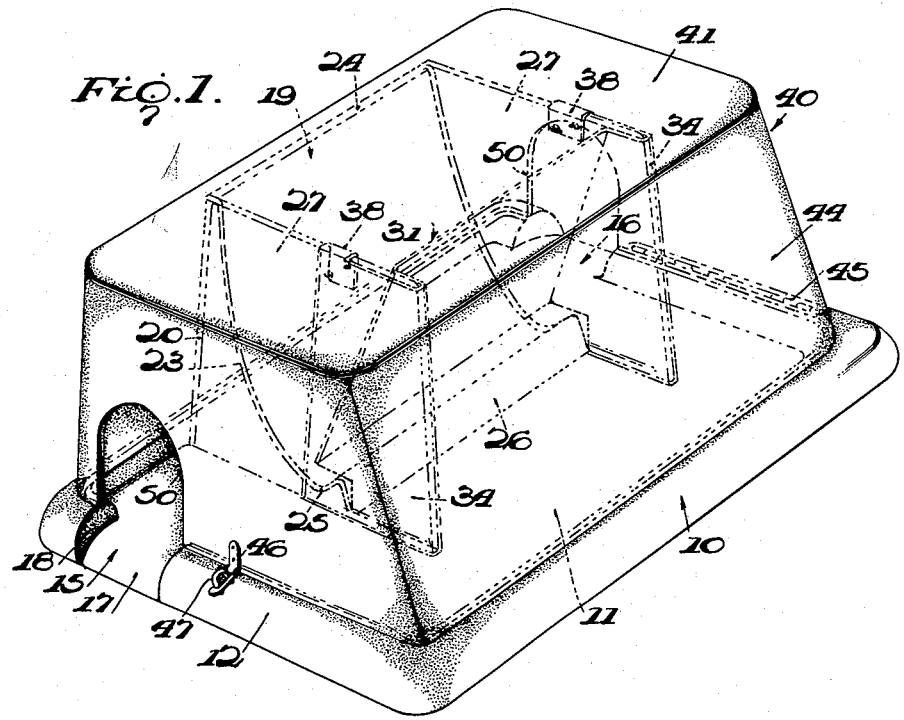
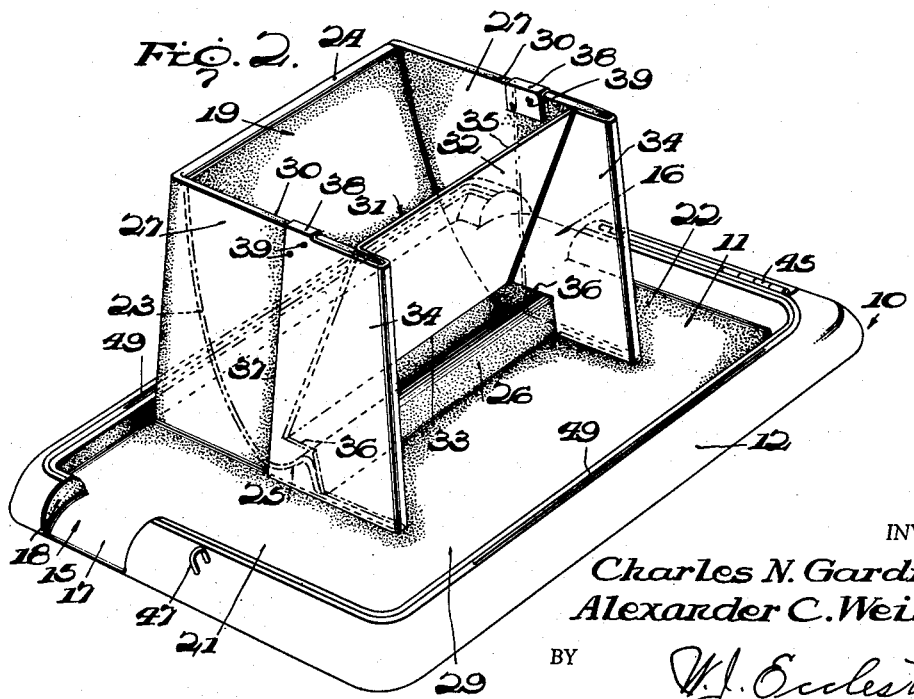
INVENTOR
Charles N. Gardner.
Alexander C. Weiss
BY
W. J. Eccleston
ATTORNEY

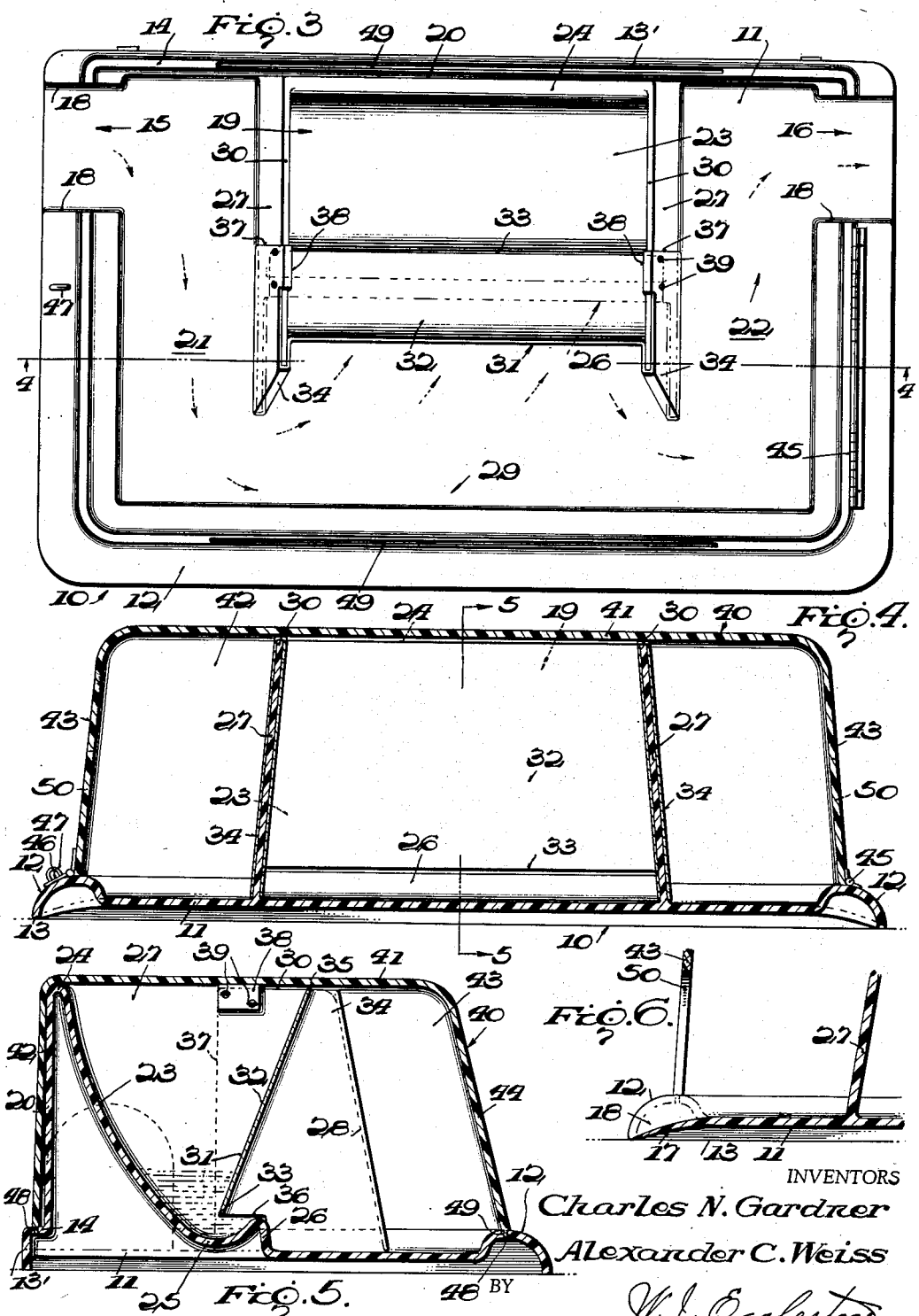

Patented July 13, 1954

2,683,326

UNITED STATES PATENT OFFICE 2,683,326

RODENT EXTERMINATING DEVICE

Charles N. Gardner, Suitland, and Alexander C. Weiss, Takoma Park, Md., assignors to the United States of America as represented by the Secretary of the Army Application October 8, 1952, Serial No. 313,814

7 Claims. (Cl. 43—131)

(Granted under Title 35, U. S. Code (1952), sec. 266)

The invention described herein, if patented, may be manufactured and used by or for the Government for governmental purposes, without the payment to us of any royalty thereon.

Our invention relates to a device for exterminating rodents.

A primary object of the invention is to provide a rodent exterminating device which is adapted to be manufactured in quantity, at extremely low cost, and constructed so as to be durable and long lasting in use.

A further object is to provide a device of the above-mentioned character having its major components formed of molded plastic material or the like, and embodying a minimum number of parts which are easy to assemble, disassemble and maintain.

A still further object is to provide a rodent exterminating device which will lure the rodent into the same for consuming the poisonous bait, and then allow the rodent to escape and die subsequently outside of the device.

Other objects and advantages of the invention will be apparent during the course of the following description.

In the accompanying drawings, forming a part of this application, and in which like numerals are employed to designate like parts throughout the same, Figure 1 is a perspective view of a rodent exterminating device embodying our invention, Figure 2 is a further perspective view of the device with its hinged cover removed, Figure 3 is a plan view of the device as shown in Figure 2, Figure 4 is a longitudinal vertical section through the device, on line 4—4 of Figure 3, Figure 5 is a transverse vertical section on line 5—5 of Figure 4, and, Figure 6 is a fragmentary vertical cross section through the device at one of the entrance openings of the same.

In the drawings, where for the purpose of illustration is shown a preferred embodiment of our invention, the numeral 10 designates generally a base or body portion of the device which is unitary and preferably formed from molded plastic material or the like. The base 10 includes a flat rectangular floor plate 11, formed near its marginal edge to provide an upwardly offset transversely curved marginal molding 12 which opens downwardly and has its lower edge 13 spaced slightly below the floor plate 11 for maintaining the floor plate slightly elevated as shown in Figures 4 and 5. The curved marginal molding 12 extends about three sides of the base 10, as shown, and the rear side of the base has a low vertical wall or flange 13' extending continuously therealong and integrally secured to the floor plate 11 and curved molding 12. A narrow substantially horizontal ledge 14 projects laterally inwardly of the vertical wall 13' and is formed integral therewith, and the ledge 14 is flush with the top of the curved molding 12, as shown.

Near and forwardly of the rear wall 13' of the base, the curved molding 12 is cut away at the opposite ends of the base to provide entrance and exit passages 15 and 16 leading into and from the floor plate 11. Adjacent to the passages 15 and 16, the floor plate 11 slopes downwardly to form inclined portions or ramps 17, Figure 6, over which the rodent travels when entering or leaving the device. The cut away sections of the molding 12 at the sides of the passages 15 and 16 are closed, as shown at 18.

A feeder 19 is mounted upon the base 10 and preferably formed integral therewith. This feeder comprises a rear substantially vertical wall 20 having its lower end integrally secured to the horizontal edge 14, Figure 5, and projecting above the base 10 for a substantial distance. The opposite ends of the wall 20 are spaced inwardly of the ends of the base 10 for substantial equal distances. The feeder 19 further comprises a forward steeply sloping curved wall 23 having its top end integrally secured to the top of the wall 20 by a rounded portion or bead 24. The lower end of the forward wall 23 extends close to the floor plate 11 and is further formed to provide an upwardly opening concave trough portion 25, integral therewith, and disposed near and rearwardly of the transverse center of the base 10, Figure 5. The forward side of the trough forming portion 25 is integrally connected with the floor plate 11 by a low substantially vertical wall 26, coextensive longitudinally with the portion 25 and walls 23 and 20.

The feeder 19 further comprises generally vertical end walls or panels 27, integrally secured to the ends of the walls 20, 23 and 26, and also having their lower ends integrally secured to the floor plate 11 as shown. The end walls 27 project for substantial distances forwardly of the low wall 26, as shown, to provide transverse areas or passageways 21 and 22 on the floor plate 11 between the end walls and the adjacent molding 12. The end walls 27 have their forward inclined edges 28 terminating near and inwardly of the forward side of the base 10 to provide a longitudinal passageway 29, Figure 2, over the floor plate 11 near the forward side of the device. The longitudinal passageway 29 leads directly to the transverse passageways 21 and 22 as best shown in Figure 2. As shown clearly in Figures 3 and 4, the feeder end walls 27, although generally vertical, converge upwardly slightly. The top edges 30 of the end walls 27 are horizontal, and arranged at the elevation of the horizontal bead 24. The arrangement is such that the feeder 19 is arranged near the rear side of the base 10 and spaced inwardly of its forward side and opposite ends, as previously stated. As shown clearly in the drawings, the entrance and exit passages 15 and 16 lead directly to the transverse passageways 21 and 22.

In order to control the gravity feed of granular poisonous bait held within the feeder 19, we provide a sheet metal baffle or spreader designated generally by the numeral 31 and including a forwardly inclined generally vertical wall or body portion 32 having its lower edge 33 arranged directly over the trough forming portion 25 and spaced above the same, Figure 5. The lower horizontal edge 33 of the spreader is disposed near and slightly above the top of the low wall 26, and the spreader wall or body portion 32 extends continuously for the full distance between the feeder end walls 27, for regulating the flow of the bait by gravity to the trough forming portion 25.

The spreader body portion 32 is bodily carried at its ends by U-shaped attaching parts or flanges 34, integral therewith, and these U-shaped attaching parts receive the forward edges 28 of the feeder end walls 27, and extend throughout the entire height of the end walls 27 as shown. The upper longitudinal edge 35 of the spreader body portion 32 is flush with the tops of the U-shaped connecting parts 34 and end walls 27, while the lower edge 33 of the spreader terminates above the bottoms of the connecting parts 34 which may rest directly upon the floor plate 11, Figure 2. The inner sides of the U-shaped connecting parts 34 are provided with rectangular notches 36, to accommodate the forward side of the trough portion 25 and low wall 26, Figure 5. The outer sides of the U-shaped connecting parts 34 extend for substantial distances rearwardly over the feeder end walls 27 and have their rear vertical edges 37 terminating in substantial alignment with the longitudinal center line of the trough portion 25, Figure 5. The end walls 27 preferably engage snugly within the U-shaped connecting parts 34, and the connecting parts are provided upon their outer sides and at their upper rear corners with integral extensions or tabs 38 which are bent over the top edges 30 of the end walls 27 and downwardly upon inner faces of the end walls, as shown. The sheet metal spreader 31 is detachably secured to the feeder 19 by means of cotter pins 39 or the like which engage through suitable openings formed in the tabs 38, end walls 27 and connecting parts 34. The arrangement forms a very sturdy and durable construction, which is highly simplified and extremely compact.

A cover 40 of molded plastic material is provided for the device, and the cover has a flat rectangular top 41 which may substantially contact the top edges 30 and bead 24. The rear side 42 and ends 43 of the cover 40 are substantially vertical, and the forward side 44 is inclined and preferably parallel to the inclined forward edges 28 of the feeder end walls 27 as best shown in Figure 5. The cover 40 is entirely open at its bottom and the bottom marginal edge of the cover is adapted to rest upon the top of the molding 12, about three sides of the base 10, the rear side 42 of the cover resting upon the rear horizontal ledge 14. One end 43 of the cover 40 has its lower edge connected with the top of the curved molding 12 by means of a hinge 45 which extends from one corner of the base 10 to the inner side of the adjacent passage 16. The opposite end 43 of the cover carries a hasp 46, for coaction with a U-shaped staple 47, rigidly mounted upon the molding 12 at the transverse center of the base 10. With this arrangement, the cover 40 may be locked in its closed position by means of a padlock or the like. The cover 40 is preferably provided along its bottom longitudinal edges with small longitudinal tongues 48, integral therewith which are received by longitudinal grooves 49 in the ledge 14 and forward side of the molding 12, as shown. This tongue and groove arrangement serves to positively position the cover in its closed position. The cover is provided in its ends 43 with inverted U-shaped openings 50, registering with the passages 15 and 16 of the base 10, and providing with these passages the entrance and exit openings into the device.

In use, the feeder 19 may be filled or partly filled with suitable poisonous bait, and this bait will be fed by gravity to the trough portion 25, and will not overflow the trough portion due to the presence of the baffle or spreader 31. The cover 40 is locked in the closed position and the device is placed in a warehouse or the like for the purpose of exterminating rodents. The rodents enter the device through either of the passages 15 or 16, and then pass through either passageway 21 or 22 to the forward side of the trough 25. Here the rodents take the poisonous bait and leave the device through one of the passages 15 or 16, to later die outside of the device.

It is to be understood that the form of our invention, herewith shown and described is to be taken as a preferred example of the same, and that various changes in the shape, size and arrangement of parts may be resorted to, without departing from the spirit of the invention or scope of the subjoined claims.

Having described our invention, we claim:

1. In a device of the character described, a feeder including a rear relatively high sloping side and a forward relatively low side, upstanding end walls for the feeder extending forwardly of said forward side and above the same, a baffle arranged over the feeder to regulate the flow of material to the bottom thereof, upstanding substantially U-shaped elements carried by the ends of the baffle and having their rear ends open and receiving said upstanding end walls forwardly of said forward side of the feeder, and substantially L-shaped tabs secured to the tops of the U-shaped elements and engaging over the tops of said end walls for securing the baffle thereto.

2. In a device of the character described, a feeder having a rear relatively high sloping side and a forward relatively low side, upstanding end walls for the feeder extending forwardly of said forward side and above the same, an inclined baffle arranged over the feeder in upwardly diverging relation to said rear sloping side and adapted to regulate the flow of material to the bottom of the feeder, upstanding notched members carried by the ends of the baffle and engageable rearwardly over the forward ends of said end walls, substantially L-shaped elements secured to the tops of said members and engaging over the tops of the end walls and downwardly upon the inner faces thereof, and pin means engaging through said elements and end walls for securing the baffle thereto.

3. In a device of the character described, a substantially horizontal base, a feeder mounted upon the base and having a relatively high inclined side and a relatively low side spaced from the inclined side, upstanding end walls for the feeder connecting said low and inclined sides and extending forwardly of the low side and above the same for a substantial distance, an inclined baffle arranged over the feeder and extending for substantially the entire distance between said end walls and having its lower end arranged between said inclined and low sides of the feeder and adapted to regulate the passage of material to the bottom of the feeder, upstanding generally U-shaped extensions carried by the ends of the baffle and engageable over the forward ends of said upstanding end walls and having sides arranged adjacent to the opposite faces of the end walls, the inner sides of said extensions having notches receiving said low side of the feeder forwardly of the lower end of said baffle, and means engaging said end walls and extensions for detachably securing the same together.

4. A device of the character described comprising a substantially horizontal base, a feeder mounted upon the base near one side of the same and including a relatively high sloping side and a relatively low side spaced a substantial distance from the opposite side of the base, upstanding end walls for the feeder spaced inwardly of the ends of the base and extending forwardly of said low side of the feeder for a substantial distance and above the low side of the feeder, said end walls terminating inwardly of said opposite side of the base, an inclined baffle arranged over the feeder between said end walls and adapted to regulate the flow of material to the bottom of the feeder, notched extensions carried by the ends of the baffle and receiving the upstanding end walls, means for detachably securing said extensions to the upstanding end walls, and a cover for the base and feeder extending over a major portion of the area of the base and provided in its opposite ends with openings arranged opposite the end walls near said one side of the base, said cover defining with said feeder and end walls longitudinal and transverse passages over the base, the openings of said cover leading into the transverse passages near said one side of the base.

5. In a device of the character described, a feeder including a rear relatively high sloping side and a forward relatively low side, upstanding end walls for the feeder extending forwardly of said forward side and above the same, a baffle arranged over the feeder to regulate the flow of material to the bottom of the feeder, and upstanding substantially U-shaped elements carried by the ends of said baffle and having their rear ends open and receiving said upstanding end walls forwardly of said forward side of the feeder.

6. A device of the character described comprising a substantially horizontal base, a feeder mounted upon the base near one side of the base and including a relatively high sloping side and a relatively low side spaced a substantial distance from the opposite side of the base, upstanding end walls for the feeder spaced inwardly of the ends of the base and extending forwardly of said low side of the feeder for a substantial distance and above said low side of the feeder, said end walls terminating inwardly of said opposite side of the base, an inclined baffle arranged over the feeder between said end walls and adapted to regulate the flow of material to the bottom of the feeder, members carried by the ends of the baffle and engageable with said end walls for attaching the baffle to the end walls, and a cover for the base and feeder extending over a major portion of the area of the base and provided in its opposite ends with openings arranged opposite the end walls near said one side of the base, said cover defining with said feeder and end walls longitudinal and transverse passages over the base, the openings of said cover leading into the transverse passages near said one side of the base.

7. In a device of the character described, a feeder including a rear relatively high sloping side and a forward relatively low side, upstanding end walls for the feeder extending forwardly of said forward side and above the same, an inclined baffle arranged over the feeder to regulate the flow of material to the bottom of the feeder and converging downwardly with relation to said relatively high sloping side of the feeder, and members carried by the ends of the baffle and having openings in their rear ends and being engageable rearwardly over said upstanding end walls of the feeder for detachably securing the baffle to the feeder.

References Cited in the file of this patent

UNITED STATES PATENTS

| Number | Name | Date |
|---|---|---|
| 939,533 | Myers | Nov. 9, 1909 |
| 1,321,360 | Bright | Nov. 11, 1919 |
| 1,400,307 | Mittman | Dec. 13, 1921 |
| 2,475,462 | Rosen | July 5, 1949 |
| 2,480,724 | Feussner | Aug. 30, 1949 |